Aug. 4, 1942.   L. NEURURER   2,291,981
SPOON
Filed April 14, 1941
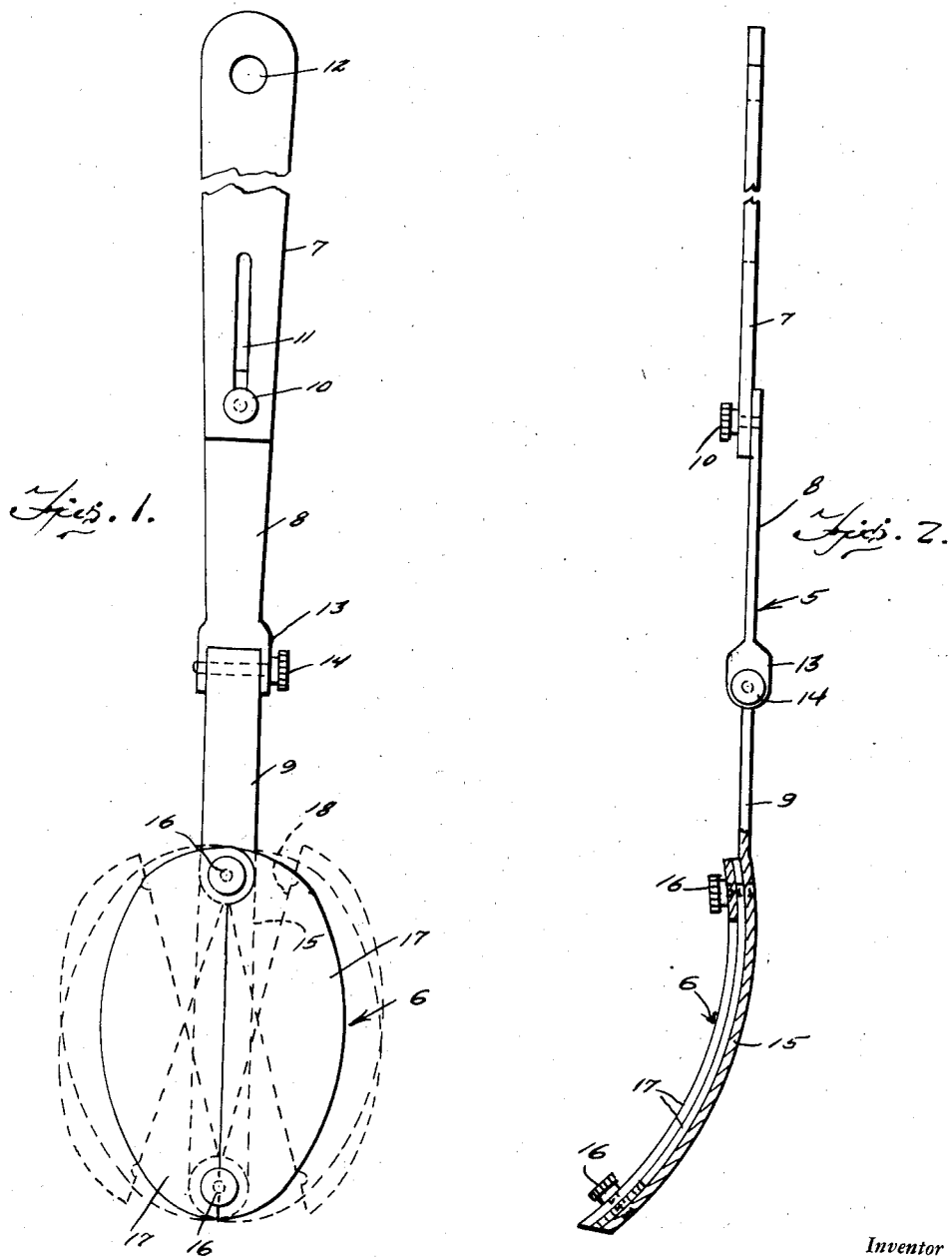
Inventor
Leo Neururer
By  Clarence A. O'Brien
Attorney Patented Aug. 4, 1942

2,291,981

UNITED STATES PATENT OFFICE 2,291,981

SPOON

Leo Neururer, Lake Geneva, Wis.

Application April 14, 1941, Serial No. 388,513

4 Claims. (Cl. 30—324)

This invention relates to spoons, and has for the primary object the provision of an improved handle construction which may be conveniently adjusted as to length and into various angular positions with respect to the bowl of the spoon and also an improved bowl construction which may be readily made of closed wall construction or into open wall construction and at the same time have the size of the bowl varied.

With these and other objects in view as will become more apparent as the description proceeds, the invention consists in certain novel features of construction, combination and arrangement of parts to be hereinafter more fully described and claimed.

For a complete understanding of my invention, reference is to be had to the following description and accompanying drawing, in which Figure 1 is a front elevation illustrating a spoon constructed in accordance with my invention.

Figure 2 is an edge elevation, partly in section, illustrating the spoon.

Referring to the drawing in detail, the numeral 5 indicates the handle of the spoon and 6 the bowl. The handle consists of sections 7, 8 and 9. The section 8 has threaded thereto a thumb screw 10 which extends through a slot 11 in the section 7. The purpose of the thumb screw is to adjustably secure the sections 7 and 8 together whereby the length of the handle may be varied. The section 7 is provided with an opening 12 to receive a hook or like support. The section 8 has a bifurcated end 13, the arm portions of which are apertured and one of said apertures are screw threaded to receive a set screw 14 and which also extends through an aperture in the end of the section 9 thereby hingedly connecting the sections 8 and 9 together permitting these sections to be arranged at various angles with respect to each other and the sections 7 and 8 at various angles with respect to the bowl.

It is to be understood that the apertured end of the section 9 extends into the bifurcation, this being clearly shown in Figure 1.

The section 9 forms the shank of the handle which supports the bowl 6 and is provided with an arcuately curved portion 15 conforming to the contour of the convex face of the bowl 6 and underlies the latter and has threaded therein spaced thumb screws 16.

The bowl 6 is constructed of companion sections 17, the adjacent edges of which are provided with notches 18 to receive the set screws 16.

The companion sections have their adjacent edges arranged in overlapped relation when secured by both of the set screws, thereby bringing the sections of the bowl tightly together and detachably joining them onto the shank 9 of the handle.

At any time when it is desired to construct or form the bowl into open construction, the sections may be released from one or the other of the set screws to assume the dotted line position, as shown in Figure 1. Besides forming the bowl into open construction, also increases the size of the bowl.

While I have shown and described the preferred embodiment of my invention, it will be understood that minor changes in construction, combination and arrangement of parts may be made without departing from the spirit and scope of the invention as claimed.

What I claim is:

1. In a spoon, a handle including a shank having an arcuately curved portion, and a bowl seated on and detachably secured to the arcuately curved portion.

2. In a spoon, a handle including a plurality of sections, means for adjustably connecting a pair of said sections, means for hingedly connecting one of the sections of said pair of sections to one of the other sections and the latter-named section including an arcuately curved portion, and a bowl mounted on the arcuately curved portion.

3. In a spoon, a handle including a pair of sections pivotally and slidably connected for relative adjustment longitudinally and laterally, respectively, one of said sections of the handle including an arcuately curved portion, and a bowl detachably secured on the arcuately curved portion and including companion sections.

4. In a spoon, a handle including an arcuately curved portion, thumb screws carried by the arcuately curved portion, a bowl portion including companion sections having adjacent edges arranged to overlap and seated on the arcuately curved portion and having notches to receive the set screws for detachably securing the sections to the arcuately curved portion whereby either of said set screws may be adjusted to release the companion sections for pivotal movement on the arcuately curved portion.

LEO NEURURER.